Jan. 12, 1960
H. GREENHOW
2,920,816
NUMERAL WHEEL CONSTRUCTION
Filed Aug. 31, 1953
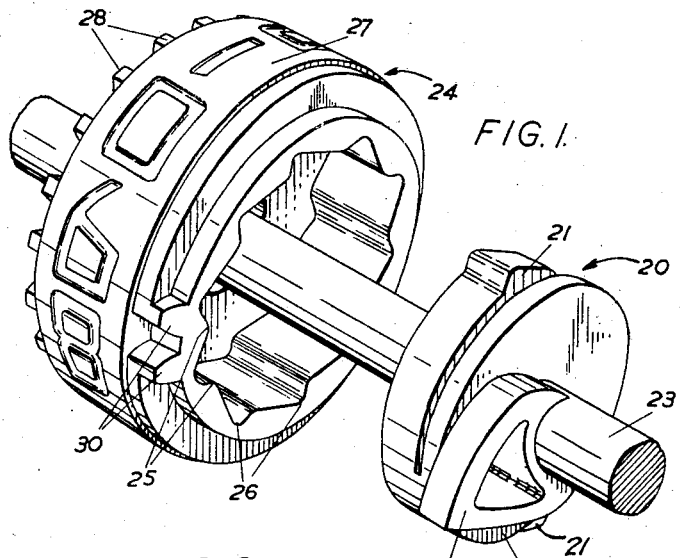
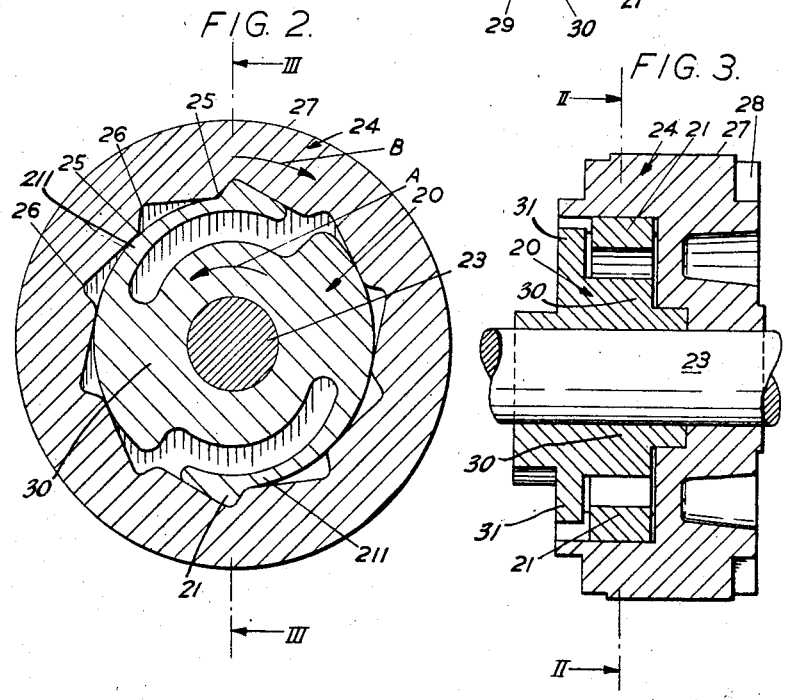
Inventor
Henry GREENHOW
By
Attorney

United States Patent Office 2,920,816
Patented Jan. 12, 1960

2,920,816
NUMERAL WHEEL CONSTRUCTION

Henry Greenhow, London, England, assignor to English Numbering Machines Limited, Enfield, England, a British company Application August 31, 1953, Serial No. 377,566

Claims priority, application Great Britain September 2, 1952

1 Claim. (Cl. 235—1)

The invention relates to counting devices.

As is known, many counting devices comprise one or more rotatable composite members of the kind wherein each rotatable member is composed of two parts, of which one part, when rotated in one sense, carries the other part with it, while the two parts are rotatable relatively to each other. In known composite members of this kind, the coupling between the two parts is effected by a separate ratchet mechanism. A composite member of the kind referred to may be used as a number wheel of a counting device, in which case the first part is rotatable by an actuating driving mechanism of the counting device, while the other part is rotatable relatively to the first part by a zeroizing mechanism of the counting device. Again, a composite member of the kind referred to may be used as an additional number wheel for setting the counting device to perform a predetermined count, in which case the first part is rotatable by the actuating driving mechanism of the counting device, while the other part is manually rotatable relatively to the first part for setting the counting device to perform a predetermined count.

It is an object of the invention to provide a simplified composite member of the kind referred to which is easy to manufacture and is reliable in use.

To make the invention clearly understood, reference will now be made to the accompanying drawings, which are given by way of example and in which:

Fig. 1 is an exploded perspective view of a rotatable composite number wheel of the invention;

Fig. 2 illustrates a section through the assembled number wheel of Fig. 1, the section being perpendicular to the axis of rotation of the number wheel along the line II—II of Fig. 3; and Fig. 3 illustrates a section along the line III—III of Fig. 2.

The rotatable composite member illustrated in the drawings constitutes a number wheel for a counting device and comprises an inner part or element generally denoted by reference numeral 20 surrounded by an outer part generally denoted by reference numeral 24. Both parts 20 and 24 are made of a plastic material such as a polyamide.

The inner part 20 has a body portion 30, two elongated pawls 21 on the body portion 30, a disc-shaped portion 31 partly overlying the pawls 21, and a resetting element 29 on the disc-shaped portion 31. The body portion 30, the two pawls 21, the disc-shaped portion 31 and the re-setting element 29 are unitary with one another so as to form a single piece of plastic material constituting the said inner part 20. Each pawl 21 includes a shank 211 of a width which is so small that the pawls 21 are inherently resilient. The inner part 20 has a hole for mounting the same on a shaft 23.

The outer part 24 has projections 25 on its inner wall which are directed towards the common centre of the two parts 20 and 24, adjacent projections 25 being separated from each other by recesses 26, the shape of the pawls 21 of the inner part 20 and of the projections 25 and recesses 26 of the outer part 24 being such that the ends of the pawls 21 of the inner part 20 normally engage the recesses 26 of the outer part 24, and such that when the inner part 20 is rotated in the direction of the arrow A (Fig. 2) by a drive, the outer part 24 is rotated bodily with the inner part 20 or when the outer part 24 is rotated in the direction of the arrow B (Fig. 2) by a drive the inner part 20 is bodily rotated with the outer part 24, whereas, when one of the two parts is held in a fixed position, the other part may be rotated in the direction opposite to the direction of the inscribed arrow relatively to the fixed part while the pawls 21 of the inner part 20 ratchet over the projections 25 of the outer part 24. On the circumference 27 of the outer part 24, numbers are provided (see Fig. 1). The outer part 24 is provided with teeth 28 integral and co-axial with the outer part 24, a drive acting on the teeth 28. The re-setting element 29 forms part of a zeroizing mechanism, which is well known and needs here no further description. Teeth 30 are integral with the outer part 24 and form part of a tens-transfer mechanism which is also well known and needs no further description.

The embodiment just described has many advantages over known rotatable composite members of the kind referred to. The inner part 20, together with its pawls 21 and the re-setting element 29 and the outer part 24 may be manufactured in a simple manner by moulding it from, or machining it out of, plastic material. The pawls 21 are inherently resilient, whereby the hitherto usual separate pawls, or equivalent members, and separate springs for the ratchet mechanism are avoided and the assembly of the rotatable composite member is facilitated. If both parts 20 and 24 are made of a polyamide or another self-lubricating material, no lubrication of the ratchet mechanism is required.

It should be clearly understood that many modifications of the embodiment described are possible without departing from the spirit of the present invention.

I claim:

For a counting device, an integral number wheel element made of plastic material and comprising a body portion, an elongated pawl on said body portion, a disc-shaped portion at least partly overlying said pawl, and a re-setting element on said disc-shaped portion, the said body portion, pawl, disc-shaped portion and re-setting element being unitary with one another so as to form a single piece of plastic material, the said pawl, at least at one region, having a reduced thickness so that the pawl is inherently resilient.

References Cited in the file of this patent

UNITED STATES PATENTS

| 2,137,013 | Bradley | Nov. 15, 1938 |
| 2,242,699 | Flader | May 20, 1941 |
| 2,444,570 | Lawrence et al. | July 6, 1948 |

FOREIGN PATENTS

| 581,816 | Great Britain | Oct. 25, 1946 |

OTHER REFERENCES

Plastics Bulletin, volume 12, 1950, page 191.